(12) United States Patent
Lichney

(10) Patent No.: US 8,051,877 B2
(45) Date of Patent: Nov. 8, 2011

(54) DIVERTER VALVE AND ASSEMBLY

(75) Inventor: John J. Lichney, Youngstown, OH (US)

(73) Assignee: Delphi Technologies, Inc., Troy, MI (US)

( * ) Notice: Subject to any disclaimer, the term of this patent is extended or adjusted under 35 U.S.C. 154(b) by 851 days.

(21) Appl. No.: 12/082,626

(22) Filed: Apr. 10, 2008

(65) Prior Publication Data

US 2009/0255600 A1  Oct. 15, 2009

(51) Int. Cl.
*F16K 11/085* (2006.01)
*B07C 5/34* (2006.01)
*B65G 53/04* (2006.01)

(52) U.S. Cl. .................. 137/625.47; 137/555; 209/655; 406/151; 406/183

(58) Field of Classification Search ............. 137/625.47, 137/876, 555; 209/655; 406/183, 151
See application file for complete search history.

(56) References Cited

U.S. PATENT DOCUMENTS

| | | | | |
|---|---|---|---|---|
| 2,045,769 A | * | 6/1936 | Geffcken et al. | 315/241 R |
| 2,995,775 A | * | 8/1961 | Schnitzius et al. | 425/217 |
| 3,265,208 A | * | 8/1966 | Reniker et al. | 209/568 |
| 3,776,675 A | * | 12/1973 | Veneria | 425/139 |
| 4,055,280 A | * | 10/1977 | Kohl et al. | 222/504 |
| 4,299,251 A | * | 11/1981 | Dugas | 137/556 |
| 4,372,337 A | * | 2/1983 | Holzenberger | 137/240 |
| 5,039,258 A | * | 8/1991 | Falusi et al. | 406/46 |
| 5,377,847 A | * | 1/1995 | Kind | 209/655 |
| 6,365,858 B1 | * | 4/2002 | Vicktorius et al. | 209/567 |
| 2007/0079882 A1 | | 4/2007 | Muller | |

* cited by examiner

*Primary Examiner* — John Fox
(74) *Attorney, Agent, or Firm* — Thomas N. Twomey

(57) ABSTRACT

A diverter valve assembly is used in a material handling system and may include a diverter valve, an actuator, a chute, and a material handling line. The diverter valve has a body that defines an inlet bore and a pair of outlet bores. A rotor is located within the body and rotates, depending on factors, between the pair of outlet bores. The actuator is connected to the rotor in a way that it can rotate the rotor. The chute communicates with the inlet bore. And a material handling line communicates with each of the pair of outlet bores.

13 Claims, 3 Drawing Sheets

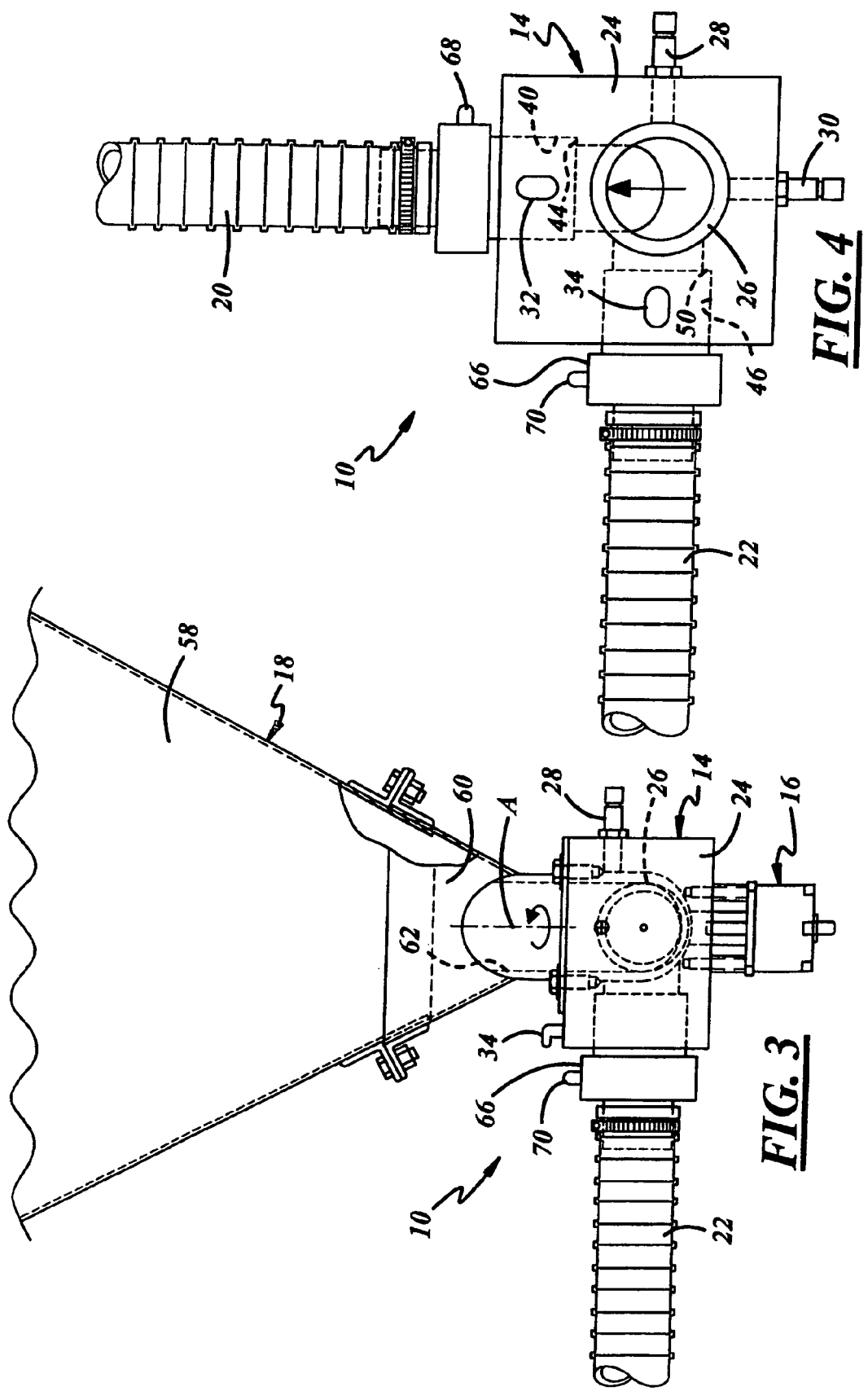

DIVERTER VALVE AND ASSEMBLY

FIELD OF THE INVENTION

This invention relates generally to diverter valves, and more particularly to diverter valve assemblies used in material handling system.

BACKGROUND OF THE INVENTION

Material handling systems can be used to, among other things, sort material and transport material from one area to the next. Oftentimes, it may be necessary to multiplex transported material, meaning that material being transported in multiple material lines is combined into a single material line; and it may be necessary to demultiplex transported material, meaning that material being transported in a single material line is separated into multiple material lines. For example, an injection molded part can be transported from an injection molding machine and to a part discriminator system by a vacuum conveyer. The part discriminator system scans and inspects the injection molded part and determines whether the part is good and acceptable (e.g., no imperfections) or bad and unacceptable. Usually, the good and bad parts need to be separated without cross-contaminating, or otherwise mixing the parts, such as can occur by part bounce.

SUMMARY OF THE INVENTION

One embodiment of the invention may include a diverter valve assembly that is used in a material handling system. The diverter valve assembly may include a diverter valve, an actuator, a chute, and a material handling line. The diverter valve includes a body and a rotor. The body defines an inlet bore and at least a pair of outlet bores. The rotor is located within the body and can rotate in the body between the outlet bores. The actuator is connected to the rotor so that it can rotate the rotor upon command. The chute communicates with the inlet bore. And a material handling line is provided for, and communicates with, each of the outlet bores.

Another embodiment of the invention may include a diverter valve assembly that is used in a part discriminator system. The diverter valve assembly may include a diverter valve, an actuator, a chute, a first outlet line, and a second outlet line. The diverter valve includes a body and a rotor. The body defines an inlet bore, a first outlet bore, and a second outlet bore. The rotor is located within the body and can rotate between the first outlet bore and the second outlet bore. The actuator is connected to the rotor so that it can operate the rotor upon command. The chute is connected to the body of the diverter valve and communicates with the inlet bore. The chute receives parts in the part discriminator system. The first outlet line communicates directly or indirectly with the first outlet bore in order to receive parts deemed acceptable by components of the part discriminator system. The second outlet line communicates directly or indirectly with the second outlet bore in order to receive parts deemed unacceptable by components of the part discriminator system.

Another embodiment of the invention may include a diverter valve assembly that is used in a material handling system. The diverter valve assembly may include a diverter valve, an actuator, a chute, a first nozzle, a second nozzle, a first vacuum generator, a second vacuum generator, a first outlet line, and a second outlet line. The diverter valve may include a body, a rotor, a first proximity sensor, a second proximity sensor, a first vacuum sensor, and a second vacuum sensor. The body defines an inlet bore, a first outlet bore, and a second outlet bore. The rotor is located within the body and rotates between the first outlet bore and the second outlet bore. The first and second proximity sensors are connected to the body in order to detect the position of the rotor, and the first and second vacuum sensors are connected to the body in order to detect a vacuum. The actuator is connected to the rotor so that it can rotate the rotor upon command. The chute is connected to the body and communicates with the inlet bore. The chute can receive material in the material handling system. The first nozzle communicates with the first outlet bore, and the second nozzle communicates with the second outlet bore. The first vacuum generator is connected to the first nozzle, and the second vacuum generator is connected to the second nozzle. The first outlet line communicates with the first nozzle so that it can receive material that is deemed acceptable by components of the material handling system, and the second outlet line communicates with the second nozzle so that it can receive material that is deemed unacceptable by components of the material handling system.

BRIEF DESCRIPTION OF THE DRAWINGS

FIG. 3 is fragmented side view of the diverter valve assembly of FIG. 1;

FIG. 4 is a fragmented top view with a chute removed of the diverter valve assembly of FIG. 1, showing some hidden portions in phantom;

DETAILED DESCRIPTION OF THE PREFERRED EMBODIMENTS

Figure 1:
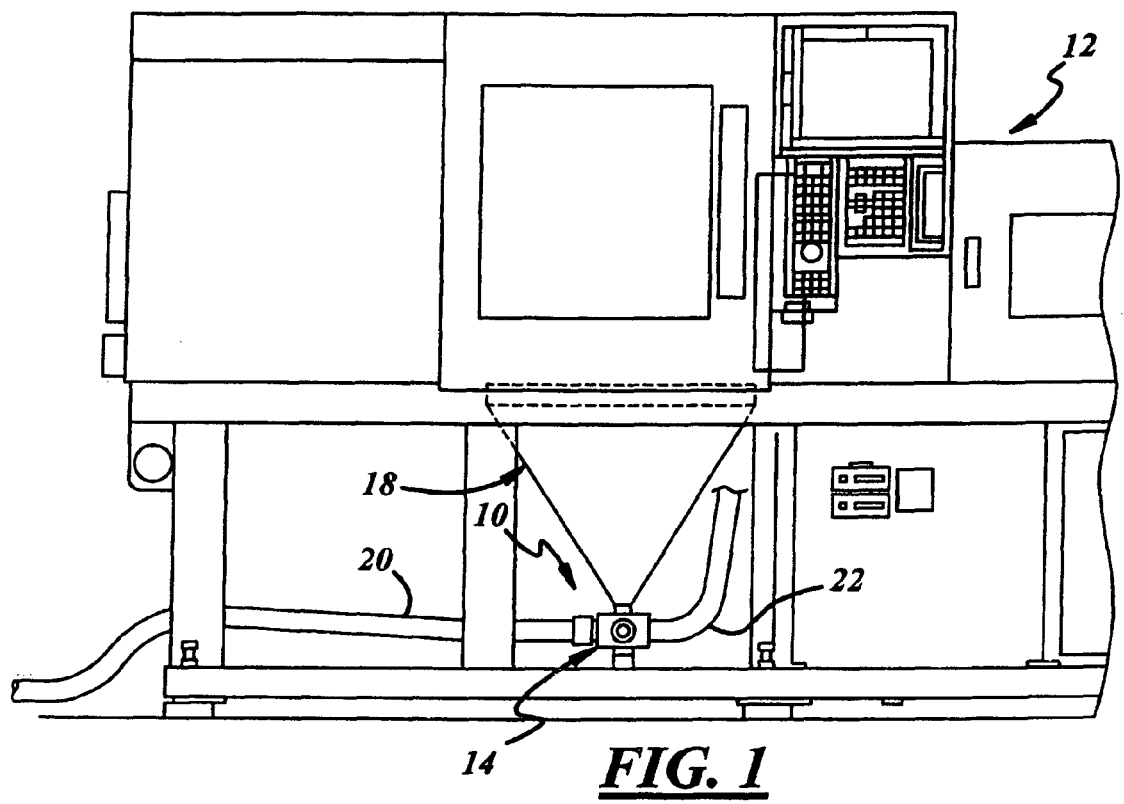
FIG. 1 is fragmented side view of a part discriminator system having a diverter valve assembly.

Referring in more detail to the drawings, FIGS. 1-5 show an embodiment of a diverter valve assembly 10 that is equipped in, and is a component of, a material handling system such as a part discriminator system 12. In the example shown, the diverter valve assembly 10 can, among other things, limit or altogether prevent cross-contamination of good parts and bad parts by a single device and at a centralized location. The diverter valve assembly 10 has a simple construction as compared to other diverter assemblies, yielding a low cost. Though shown and described with the part discriminator system 12, the diverter valve assembly 10 can be equipped in other material handling systems such as a material distribution system, a compound blending system, a packaging system, or the like. The diverter valve assembly 10 can also perform various functions such as sorting, separating, combining, or the like, as the case may be. And the diverter valve assembly 10 can handle various materials such as small injection molded parts (e.g., needle-like plugs), grains, aggregates, coarse powders, resins, or the like. The diverter valve assembly 10 can be installed as original equipment to a particular material handling system, or can be retrofitted to an existing material handling system.

The part discriminator system 12 scans and inspects parts traveling through it and determines the condition of the parts, namely whether the parts are good and acceptable, or whether the parts are bad and unacceptable. Different part discrimination systems scan, inspect, or both, different types of parts and material. Referring to the example of FIG. 1, the part discriminator system 12 is located downstream an injection molding machine (not shown) so that it can inspect finished injection molded parts coming from the machine. The part discriminator system 12 can have a vacuum conveyer (not shown) that carries and transports the injection molded parts through the system. Once inspected, the vacuum conveyer moves the injection molded parts to the diverter valve assembly 10. The part discriminator system 12 can also have a controller, such as an electronic control unit (ECU) (not shown) that relays an appropriate signal to the diverter valve assembly 10 depending upon the condition of the inspected injection molded part. Skilled artisans will know the general construction, arrangement, and operation of these types of part discriminator systems so that a more complete description will not be given here.

The diverter valve assembly 10 receives the inspected injection molded parts from the vacuum conveyer and separates the good parts from the bad parts as commanded by the controller. In one example, the good parts are sent to a parts receiver station, and the bad parts are sent to a part grinder to be reprocessed and reused. In the embodiment shown, the diverter valve assembly 10 includes a diverter valve 14 to direct injection molded parts, an actuator 16 to operate the diverter valve, a chute 18 to receive the injection molded parts, and material handling lines such as a first outlet line 20 and a second outlet line 22 that direct the injection molded parts to their respective locations.

The diverter valve 14 guides and directs the injection molded parts received from the chute 18 to either the first outlet line 20 or the second outlet line 22. In one sense, the diverter valve 14 shown constitutes a three-way rotary valve because it has one inlet and two outlets. Referring to FIGS. 2-5, the diverter valve 14 has a relatively simple construction with a body 24, a rotor 26 located within the body, a first proximity sensor 28 and a second proximity sensor 30, and a first vacuum sensor 32 and a second vacuum sensor 34.

Figure 5:
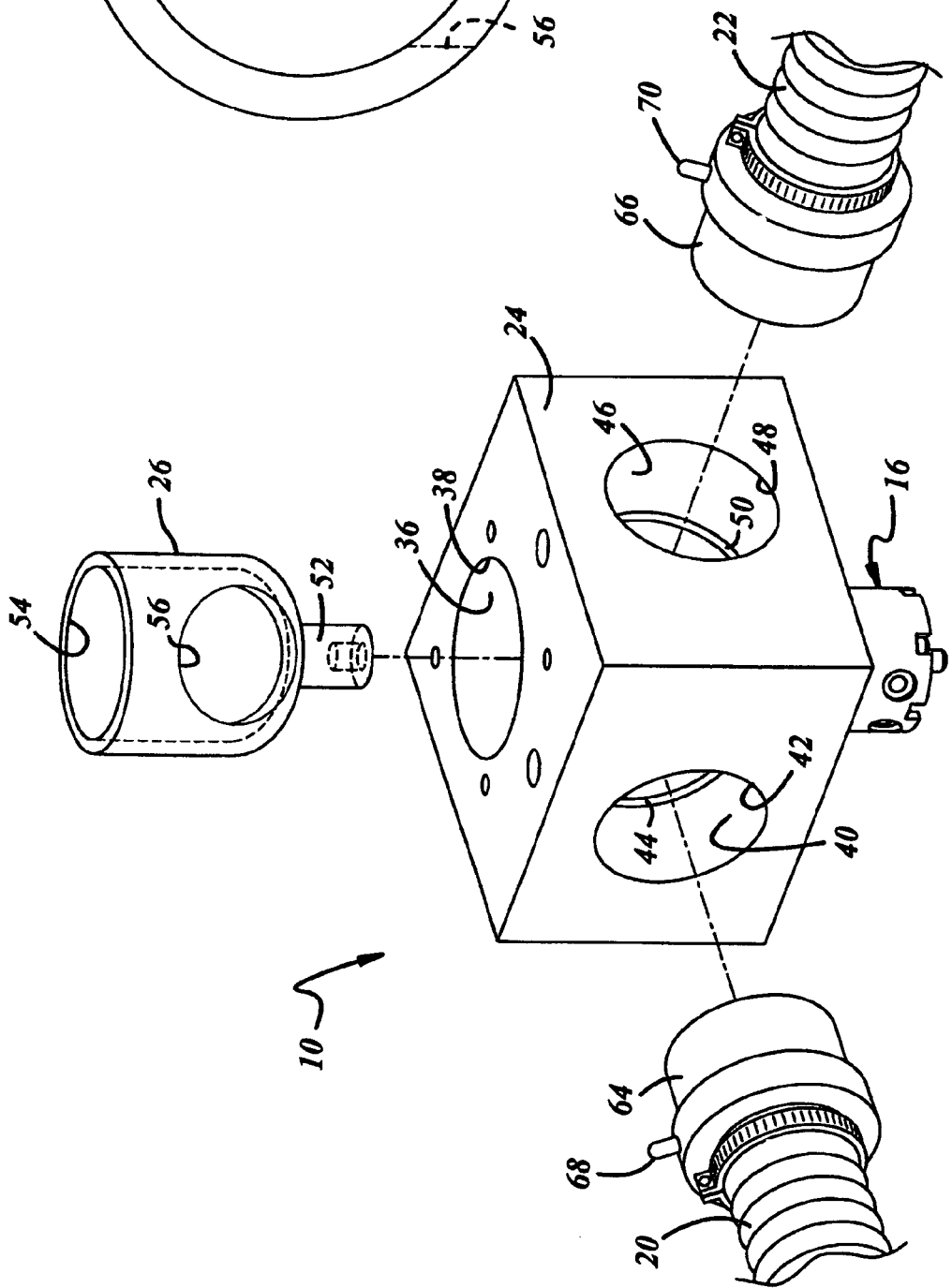
FIG. 5 is a fragmented partially exploded view showing some components of the diverter valve assembly of FIG. 1.

The body 24 is the primary casing of the diverter valve 14. The body 24 can be a unitary piece that can be composed of a solid material such as an aluminum, a steel, Delrin®, a ceramic, or the like. The exact material used for the body 24 may be dictated by, among other things, the material going through the diverter valve 14. The body 24 defines three smooth bores, having surfaces that do not interrupt or interfere with the flowing material going through the diverter valve 14. The bores are constructed to have the same diameter as their respective inlet component and outlet component—in one case the chute 18 and the first and second outlet lines 20, 22. Referring to FIG. 5, the body 24 defines an inlet bore 36 that is sized and dimensioned to fit the rotor 26 and to communicate with the chute 18. The inlet bore 36 has an inlet orifice 38 that, in one example, has a diameter of about 2.502 inches. The inlet bore 36 leads to a first outlet bore 40 and a second outlet bore 46. The first outlet bore 40 has a first outlet orifice 42 that, in one example, has a diameter of about 1.962 inches, and has a circumferentially continuous first step 44 located axially away from the first outlet orifice and that, in one example, has a diameter of about 1.65 inches. The second outlet bore 46 has a second outlet orifice 48 that, in one example, has a diameter of about 1.962 inches, and has a circumferentially continuous second step 50 located axially away from the second outlet orifice and that, in one example, has a diameter of about 1.65 inches. The body 24 also defines various holes and bores for bolting the body to, and inserting, other components of the diverter valve assembly 10.

Figure 6:
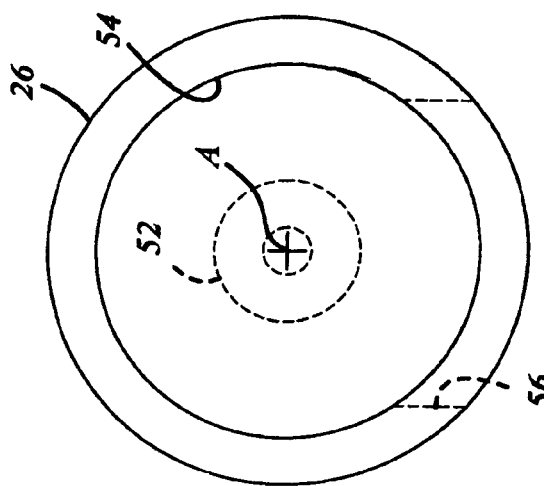
FIG. 6 is a top view of a rotor of the diverter valve assembly of FIG. 1, showing hidden portions in phantom.

The rotor 26 seats within the body 24 so that it can rotate from one position at the first outlet bore 40 to another position at the second outlet bore 46. The rotor 26 can come in various designs and constructions of a part that rotates within the body 24. In one example, the rotor 26 rotates 90° between the bores and about an axis A. The rotor 26 may be constructed of a unitary piece and composed of a solid material such as an aluminum, a steel, Delrin®, a ceramic, or the like. The exact material used for the rotor 26 may depend on, among other things, the material going through the diverter valve 14. Referring to FIGS. 3, 5, and 6, a stem 52 connects to the actuator 16 and, in one example, has about a 0.75 inch diameter. The rotor 26 also has an inlet mouth 54 that, when the rotor sits in the body 24, lies flush with an outer surface of the body and, in one example, has a diameter of about 2.00 inches. The rotor 26 also has an outlet mouth 56 that, in one example, has a diameter of about 1.65 inches.

The first and second proximity sensors 28 and 30 monitor and detect the position of the rotor 26 as the rotor rotates between the first outlet bore 40 and the second outlet bore 46. Referring to FIGS. 3 and 4, the proximity sensors are located opposite one another and adjacent an outer surface of the rotor 26. Each of the first and second proximity sensors 28 and 30 can be screwed into the body 24 of the diverter valve 14. The first and second proximity sensors 28 and 30 can come in various types including an inductive or Hall-effect sensor where no physical contact is necessarily needed between sensors and a rotor 26, and instead the rotor itself can act as a target for the sensor, or a target can be disposed on the rotor. The proximity sensors transmit the position of the rotor 26 to the controller of the part discriminator system 12. Skilled artisans will know the general construction, arrangement, and operation of proximity sensors so that a more complete description will not be given here.

The first and second vacuum sensors 32 and 34 monitor and detect pressure, namely the presence of a vacuum (or negative pressure) in the respective first outlet bore 40 and second outlet bore 46. In one embodiment, the first and second vacuum sensors 32 and 34 detect and give a value of a vacuum pressure, and in another embodiment, the vacuum sensors merely detect the presence or absence of a vacuum. Still referring to FIGS. 3 and 4, the first vacuum sensor 32 can be screwed in the body 24 adjacent the first outlet bore 40 so that it can communicate with the first outlet bore; and the second vacuum sensor 34 can be screwed in the body adjacent the second outlet bore 46 so that it can communicate with the second outlet bore. In other embodiments, the vacuum sensors can be located in the first and second outlet lines 20 and 22. The first and second vacuum sensors 32 and 34 transmit the relevant information, to the controller of the part discriminator system 12. Skilled artisans will know the general construction, arrangement, and operation of vacuum sensors so that a more complete description will not be give here.

The actuator 16 selectively operates (in this case rotates) the rotor 26 to direct the injection molded parts through either of the outlet lines. The actuator 16 can be commanded and controlled by the controller of the part discriminator system 12. The actuator 16 can be of various types including electromechanical such as an electric motor solenoid, pneumatic which is controlled by air pressure, hydraulic which is controlled by the pressure of liquids such as oil or water, or the like. Referring to FIGS. 3 and 5, the actuator 16 is of the pneumatic type and can rotate the rotor 26 as required by 90°. The actuator 16 can be carried by the body 24 by being screwed thereto, and can be connected to the stem 52 of the rotor 26; the exact connection between the actuator and the rotor can vary in different embodiments. Skilled artisans will know the general construction, arrangement, and operation of the various types of actuators so that a more complete description will not be given here.

Figure 2:
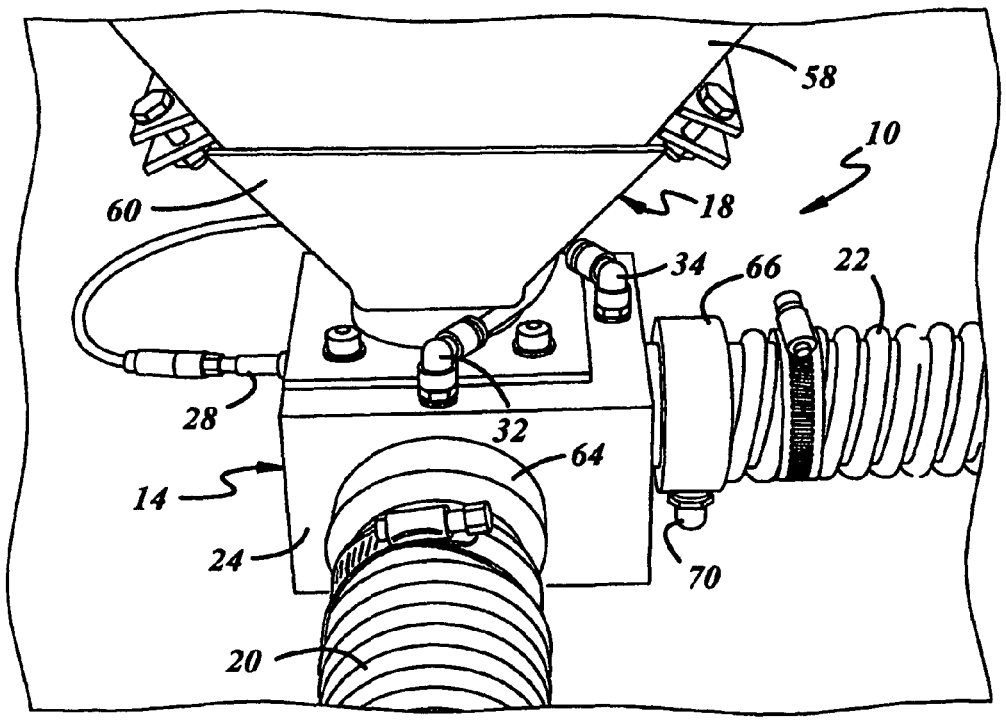
FIG. 2 is a fragmented perspective view of the diverter valve assembly of FIG. 1.

The chute 18 receives injection molded parts coming off of the vacuum conveyer. Depending on the application, the chute 18 can come in various forms including a container. Referring to FIGS. 1-3, the chute 18 has an upper portion 58 that can be bolted to a funnel portion 60. The chute 18 can be directly connected to the body 24 of the diverter valve 14, or can be indirectly connected to the body by an intervening part. In a direct connection, the funnel portion 60 can be bolted to the body 24 around the inlet orifice 38 so that the chute 18 communicates with the inlet bore 36. The funnel portion 60 has a port 62 that is dimensioned and sized similar to the inlet port 36.

The first and second outlet lines 20 and 22 receive the injection molded parts from the diverter valve 14. For example, the first outlet line 20 carries good parts to a parts receiver station, while the second outlet line 22 carries bad parts to a grinder for reprocessing. In one case, the first and second outlet lines 20 and 22 can be directly connected to the body 24 of the diverter valve 14 without any intervening parts. In another case, the first and second outlet lines 20 and 22 can be respectively attached to a first nozzle 64 and a second nozzle 66 by a nose-clamp or the like. The first and second nozzle 64 and 66 are respectively connected to and communicate with the first outlet bore 40 and the second outlet bore 46. The nozzles can be each directly connected to the body 24 of the diverter valve 14, or can each be indirectly connected to the body with intervening parts. In a direct connection, the first and second nozzle 64 and 66 can be press-fit into the respective outlet bore up to the first step 44 and the second step 50. The nozzles can have the same diameter of the respective steps.

A first and second vacuum generator 68 and 70 can be equipped directly to the respective first and second nozzle 64 and 66 to create suction that moves the injection molded parts through the diverter valve 14. The vacuum generators can come in various forms including the venturi type, the pump type, or the like. In any one of these, the first and second nozzle 64 and 66 can be instrumental in creating the suction, or may not be. The exact type of vacuum generator used may be dictated by, among other things, the desired vacuum rate, cost, space, temperature, parts cycling speed, and the like. Skilled artisans will know the general construction, arrangement, and operation of the various types of vacuum generators so that a more complete description will not be given here.

In use, the part discriminator system 12 inspects injection molded parts delivered from the associated injection molding machine and determines whether each part is good or bad. In one example, the part discriminator system 12 inspects sixty-four parts before the diverter valve assembly 10 goes through a purge cycle that evacuates the diverter valve assembly. Once determined, the controller of the part discriminator system 12 sends an appropriate signal to the diverter valve 14, and the rotor 26 rotates either to the first outlet line 20 or to the second outlet line 22.

Though shown as having one inlet bore and two outlet bores (demultiplex arrangement), the diverter valve 14 can have various arrangements with a different number of inlet bores and a different number of outlet bores. For example, the diverter valve 14 may have a single inlet bore and four outlet bores. Here, a rotor may divert parts from the inlet bore and to the different outlet bores.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

I claim:

1. A diverter valve assembly used in a material handling system, the diverter valve assembly comprising:
   a diverter valve having a body defining an inlet bore and defining a pair of outlet bores, and the diverter valve having a rotor disposed within the body to rotate between the pair of outlet bores;
   an actuator operatively connected to the rotor to selectively rotate the rotor;
   a chute communicating with the inlet bore;
   a material handling line communicating with each of the pair of outlet bores;
   a nozzle for each of the material handling lines, the nozzle interposing the material handling lines and the respective pair of outlet bores; and
   a vacuum generator connected to each of the nozzles, the vacuum generator supplying suction to the diverter valve assembly.

2. The diverter valve assembly of claim 1 wherein each nozzle is connected directly to the body of the diverter valve.

3. The diverter valve assembly of claim 1 wherein the diverter valve further has a pair of proximity sensors connected to the body to detect a rotation position of the rotor.

4. The diverter valve assembly of claim 1 wherein the rotor is fitted in the inlet bore.

5. The diverter valve assembly of claim 1, wherein the rotor is fitted in the inlet bore in a manner such that when said material enters the diverter valve assembly said material enters directly in the rotor and flows through the diverter valve to one of the pair of outlet bores based on said selective connection of the rotor.

6. The diverter valve assembly of claim 1 wherein the rotor is formed of a single unitary piece.

7. A diverter valve assembly used in a material handling system, the diverter valve assembly comprising:
   a diverter valve having a body defining an inlet bore and defining a pair of outlet bores, and the diverter valve having a rotor disposed within the body to rotate between the pair of outlet bores;
   an actuator operatively connected to the rotor to selectively rotate the rotor;
   a chute communicating with the inlet bore; and
   a material handling line communicating with each of the pair of outlet bores, wherein the diverter valve further has a pair of vacuum sensors connected to the body to detect a vacuum.

8. A diverter valve assembly for use in a part discriminator system, the diverter valve assembly comprising:
   a diverter valve having a body defining an inlet bore, a first outlet bore, and a second outlet bore, the diverter valve also having a rotor disposed within the body to rotate between the first outlet bore and the second outlet bore;

an actuator operatively connected to the rotor to selectively rotate the rotor;

a chute connected to the body and communicating with the inlet bore, the chute receiving parts;

a first outlet line communicating with the first outlet bore and receiving parts deemed acceptable;

a second outlet line communicating with the second outlet bore and receiving parts deemed unacceptable;

a first nozzle interposing the first outlet bore and the first outlet line, and a second nozzle interposing the second outlet bore and the second outlet line; and a first vacuum generator connected to the first nozzle, and a second vacuum generator connected to the second nozzle, the first and second vacuum generators supplying suction.

9. The diverter valve assembly of claim 8 further comprising a first nozzle interposing the first outlet bore and the first outlet line, and a second nozzle interposing the second outlet bore and the second outlet line.

10. The diverter valve assembly of claim 8 wherein the first and second nozzles are connected directly to the body of the diverter valve.

11. The diverter valve assembly of claim 8 wherein the diverter valve further has a first proximity sensor connected to the body adjacent the rotor, and a second proximity sensor connected to the body adjacent the rotor, the first and second proximity sensors detecting a rotation position of the rotor.

12. A diverter valve assembly for use in a part discriminator system, the diverter valve assembly comprising:

a diverter valve having a body defining an inlet bore, a first outlet bore, and a second outlet bore, the diverter valve also having a rotor disposed within the body to rotate between the first outlet bore and the second outlet bore;

an actuator operatively connected to the rotor to selectively rotate the rotor;

a chute connected to the body and communicating with the inlet bore, the chute receiving parts;

a first outlet line communicating with the first outlet bore and receiving parts deemed acceptable;

a second outlet line communicating with the second outlet bore and receiving parts deemed unacceptable; and a first vacuum sensor connected to the body, and a second vacuum sensor connected to the body, the first and second vacuum sensors detecting a vacuum.

13. A diverter valve assembly used in a material handling system, the diverter valve assembly comprising:

a diverter valve having:

a body defining an inlet bore, a first outlet bore, and a second outlet bore;

a rotor disposed within the body to rotate between the first outlet bore and the second outlet bore;

a first proximity sensor connected to the body to detect the position of the rotor;

a second proximity sensor connected to the body to detect the position of the rotor;

a first vacuum sensor connected to the body to detect a vacuum; and a second vacuum sensor connected to the body to detect a vacuum;

an actuator operatively connected to the rotor to selectively rotate the rotor;

a chute connected to the body and communicating with the inlet bore, the chute receiving material;

a first nozzle communicating with the first outlet bore;

a second nozzle communicating with the second outlet bore;

a first vacuum generator connected to the first nozzle to supply suction;

a second vacuum generator connected to the second nozzle to supply suction;

a first outlet line communicating with the first nozzle to receive material deemed acceptable; and a second outlet line communicating with the second nozzle to receive material deemed unacceptable.

* * * * *